United States Patent
Lee et al.

(10) Patent No.: US 11,963,157 B2
(45) Date of Patent: Apr. 16, 2024

(54) METHOD AND APPARATUS FOR USING UNLICENSED BAND IN COMMUNICATION SYSTEM

(71) Applicant: Samsung Electronics Co., Ltd., Gyeonggi-do (KR)

(72) Inventors: Okhwan Lee, Gyeonggi-do (KR); Woonkyun Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 645 days.

(21) Appl. No.: 17/260,127

(22) PCT Filed: Jul. 26, 2019

(86) PCT No.: PCT/KR2019/009334
§ 371 (c)(1),
(2) Date: Jan. 13, 2021

(87) PCT Pub. No.: WO2020/022836
PCT Pub. Date: Jan. 30, 2020

(65) Prior Publication Data
US 2021/0289516 A1    Sep. 16, 2021

(30) Foreign Application Priority Data
Jul. 27, 2018   (KR) .......................... 10-2018-0087645

(51) Int. Cl.
*H04W 72/12* (2023.01)
*H04W 16/14* (2009.01)
(Continued)

(52) U.S. Cl.
CPC ....... *H04W 72/1215* (2013.01); *H04W 16/14* (2013.01); *H04W 72/0453* (2013.01); *H04W 72/21* (2023.01); *H04W 88/10* (2013.01)

(58) Field of Classification Search
CPC ......... H04W 72/1215; H04W 72/0453; H04W 72/21; H04W 72/04; H04W 72/27; H04W 16/14; H04W 88/10
See application file for complete search history.

(56) References Cited

U.S. PATENT DOCUMENTS

| | | | |
|---|---|---|---|
| 10,327,203 B2 | 6/2019 | Choi et al. | |
| 2008/0037505 A1* | 2/2008 | Kim ...................... | H04W 72/04 370/343 |

(Continued)

FOREIGN PATENT DOCUMENTS

| | | |
|---|---|---|
| EP | 3 038 411 | 6/2016 |
| WO | WO 2016175435 | 11/2016 |

OTHER PUBLICATIONS

PCT/ISA/210 Search Report issued on PCT/KR2019/009334, dated Nov. 29, 2019, pp. 5.

(Continued)

*Primary Examiner* — Jamal Javaid
(74) *Attorney, Agent, or Firm* — The Farrell Law Firm, P.C.

(57) ABSTRACT

The present disclosure relates to a communication technique for convergence of an IoT technology and a. 5G communication system for supporting a higher data transfer rate beyond a 4G system, and a system therefor. The present disclosure may be applied to intelligent services (for example, smart homes, smart buildings, smart cities, smart cars or connected cars, health care, digital education, retail business, security and safety-related services, etc.) on the basis of a 5G communication technology and an IoT-related technology. The present invention provides a method and apparatus for transmitting and receiving power headroom information in a beam-forming system. In addition, the present invention provides a method of a first module of a base station in a wireless communication system, the (Continued)

method comprising the steps of: when an unlicensed band is required to be used, transmitting a. resource allocation request message with respect to the unlicensed band to a second module; receiving a response message in response to the request; and allocating a resource of the unlicensed band to a terminal on the basis of the response.

12 Claims, 11 Drawing Sheets

(51) Int. Cl.
*H04W 72/0453* (2023.01)
*H04W 72/21* (2023.01)
*H04W 88/10* (2009.01)

(56) References Cited

U.S. PATENT DOCUMENTS

| | | | |
|---|---|---|---|
| 2013/0281109 A1* | 10/2013 | Kim | H04W 72/20 455/454 |
| 2015/0085684 A1 | 3/2015 | Sadek | |
| 2016/0113015 A1 | 4/2016 | Wu | |
| 2016/0128080 A1 | 5/2016 | Verma et al. | |
| 2016/0205562 A1 | 7/2016 | Wai | |
| 2017/0094546 A1 | 3/2017 | Chai et al. | |
| 2018/0020359 A1* | 1/2018 | Belghoul | H04W 74/0816 |
| 2018/0132149 A1 | 5/2018 | Zhao et al. | |
| 2018/0146488 A1 | 5/2018 | Li et al. | |

OTHER PUBLICATIONS

PCT/ISA/237 Written Opinion issued on PCT/KR2019/009334, dated Nov. 29, 2019, pp. 5.

Qiao Qu et al., "Survey and Performance Evaluation of the Upcoming Next Generation WLAN Standard—IEEE 802.11ax", Jun. 15, 2018, pp. 157.

S. Saadat, D. Chen, K. Luo, M. Feng and T. Jiang, "License assisted access-WiFi coexistence with TXOP backoff for LTE in unlicensed band," China Communications, vol. 14, . . . No. 3, pp. 1-14, Apr. 12, 2017.

European Search Report dated Jul. 29, 2021 issued in counterpart application No. 19840422.0-1215, 6 pages.

Chinese Office Action dated Sep. 16, 2023 issued in counterpart application No. 201980050137.9, 15 pages.

* cited by examiner

METHOD AND APPARATUS FOR USING UNLICENSED BAND IN COMMUNICATION SYSTEM

PRIORITY

This application is a National Phase Entry of PCT International Application No. PCT/KR2019/009334 which was filed on Jul. 26, 2019, and claims priority to Korean Patent Application No. 10-2018-0087645, which was filed on Jul. 27, 2018, the content of each of which is incorporated herein by reference.

TECHNICAL FIELD

The disclosure relates to a communication system and, more particularly, to a method and apparatus for using an unlicensed band in a communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

A wide bandwidth may be needed in order to satisfy user needs associated with high traffic. However, frequency bands are restricted, which is a problem. Accordingly, licensed assisted access is defined, which is a technology for using LTE in an unlicensed band. In this instance, there is a desire for a method for coexistence of an unlicensed band used by a Wi-Fi system and a band used by an LTE system.

DISCLOSURE OF INVENTION

Technical Problem

An aspect of the disclosure is to provide a method and apparatus for decreasing contention between LAA and Wi-Fi for channel access, and for minimizing interference if a Wi-Fi radio access technology and an LAA-LTE radio access technology coexist within a single base station device (e.g., a small cell). A situation that does not allow a channel avoidance scheme frequently occurs in multi-LAA-LTE/Wi-Fi base station device environment. Various technologies to overcome the same are used, but they clearly have limits According to the method of the disclosure, contention for a channel between LAA-LTE and Wi-Fi may be eased and interference may be controlled, and thus, the performance of a network may be improved and the amount of power consumed by terminals connected to respective radio access technologies may be reduced.

Solution to Problem

In accordance with an aspect of the disclosure, a method of a first module of a base station in a wireless communication system, may include: transmitting a resource allocation request message associated with an unlicensed band to a second module if use of the unlicensed band is needed; receiving a response message in response to the request; and allocating, based on the response, a resource of the unlicensed band to a terminal.

In accordance with an aspect of the disclosure, a method of a second module of a base station in a wireless communication system, may include: receiving a resource allocation request message associated with an unlicensed band from a first module if use of the unlicensed band is needed; allocating a resource of the unlicensed band; and transmitting a response message including resource allocation information associated with the unlicensed band.

In accordance with an aspect of the disclosure, a first module of a base station in a wireless communication system, may include: a transceiver; and a controller configured to: transmit a resource allocation request message associated with an unlicensed band to a second module if use of the unlicensed band is needed; receive a response message in response to the request; and allocate, based on the response, a resource of the unlicensed band to a terminal.

In accordance with an aspect of the disclosure, a second module of a base station in a wireless communication system, may include: a transceiver; and a controller configured to: receive a resource allocation request message associated with an unlicensed band from a first module if use of the unlicensed band is needed; allocate a resource of the unlicensed band; and transmit a response message including resource allocation information associated with the unlicensed band.

[Advantageous Effects of Invention]

According to the disclosure, contention occurring when LAA-LTE and Wi-Fi coexist may be alleviated, so the performance of a cell may be increased and the amount of power consumed by a terminal may be reduced.

According to the disclosure, an LAA-LTE access point (AP) module and a Wi-Fi AP module divide a service time and thus, contention may be eased and deterioration in performance caused by collision and interference may be dramatically reduced. In addition, a base station informs terminals of the time when to wake up and operate, so unnecessary activation latency of LAA-LTE terminals may be dramatically reduced and the amount of power consumed may be decreased.

A packet may be protected by a trigger frame, and thus, packet loss may be prevented. Further, if a channel environment is poor, a base station does not allocate a TWT service period (SP), and thus, use of an unlicensed band may be reduced and deterioration in the performance may be prevented.

MODE FOR THE INVENTION

Figure 1:
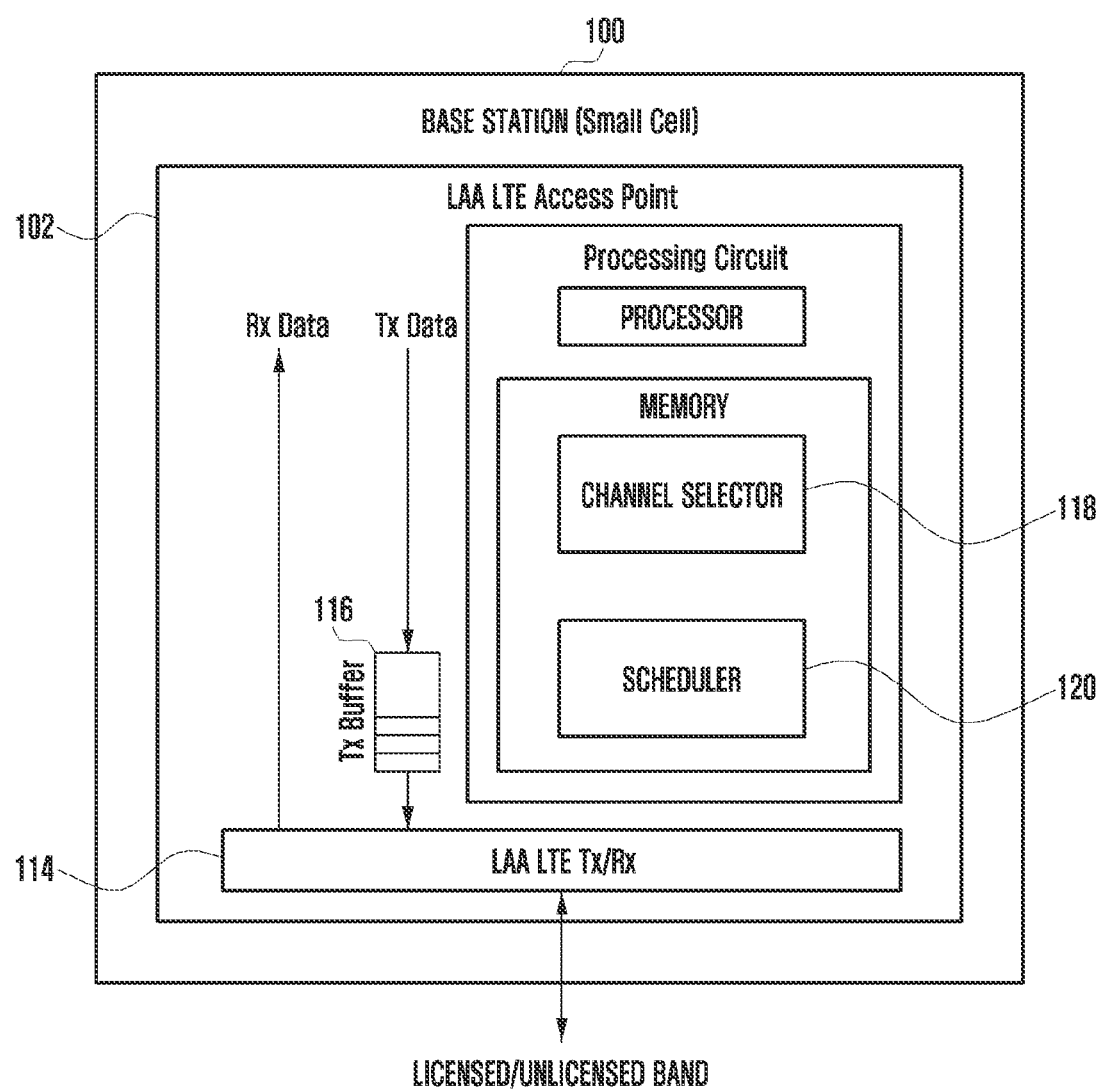
FIG. 1 is a diagram illustrating the structure of a base station for a CTS/RTS-based LAA/Wi-Fi coexistence method.

Hereinafter, embodiments of the disclosure will be described in detail in conjunction with the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

Hereinafter, embodiments of the disclosure will be described in detail in conjunction with the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In recent years, long-term evolution (LTE) has dramatically grown and succeeded. However, a wider bandwidth is still needed in order to satisfy user requirements associated with high traffic. Frequency capacity is limited and communication operators may have difficulty in providing a bandwidth capable of satisfying users, due to high costs of frequency. To overcome the same, licensed assisted access LTE (LAA-LTE), which is new technology for using LTE in an unlicensed band, has been defined.

An unlicensed band that LAA uses is 5 GHz, and is a band which is frequently used in a wireless fidelity (Wi-Fi) system such as IEEE 802.11a/n/ac/ax or the like. Wi-Fi operates based on a carrier sense multiple access and collision avoidance (CSMA/CA) for coexistence in an unlicensed band. However, as LAA that uses an unlicensed band has been employed, various schemes for coexistence in an unlicensed band have been provided for an LAA system.

As representative schemes, 1) channel avoidance scheme, 2) duty cycle-based coexistence scheme, 3) CTS-to-self and RTS/CTS scheme, and 4) back-off-based listen before talk (LBT) scheme have been provided. Detailed descriptions thereof are as follows.
1) Channel avoidance scheme: a scheme that scans neighboring channels, selects a channel that does not have a signal (e.g., a Wi-Fi signal), and uses the selected channel. That is, a base station determines whether a corresponding channel receives a signal, has a signal that exceeds a threshold value, or the like, determines whether the corresponding channel is occupied, selects a channel that is not occupied, and uses the selected channel.
2) duty cycle-based coexistence scheme: a scheme in which a base station scans channels, identifies the number of neighboring Wi-Fi terminals, and performs control for equitable use. In a Wi-Fi system, if a channel is occupied, a terminal or a Wi-Fi AP does not transmit a signal and thus, a base station is capable of transmitting a signal during a predetermined period of time and is capable of occupying an unlicensed band. The base station is capable of transmitting a signal during a maximum of 50 ms.
3) CTS-to-self and RTS/CTS scheme: a method of using an RTS/CTS frame defined in Wi-Fi. An RTS/CTS frame is a signal (frame) for occupying a channel in advance. A base station is capable of reserving use of a channel by transmitting an RTS or self CTS immediately before transmitting an LAA frame. 4) Back-off LBT: a method of obtaining a channel opportunity and performing transmission, using a CSMA scheme of Wi-Fi. That is, a base station identifies (or listens) whether a signal that is received via a channel is present during a predetermined period of time, and occupies the channel if a signal is not heard during a predetermined period of time.

In this instance, the methods have problems as follows.
1) Channel avoidance scheme: this scheme is the surest method for avoiding interference. However, an unoccupied channel is hardly detected in a complex channel environment and thus, the efficiency of the scheme is low.
2) Duty cycle-based coexistence scheme: an LAA base station occupies an unlicensed band during a predetermined period of time and thus, interference and latency may be excessively increased in Wi-Fi. Particularly, if a base station uses a channel during 50 ms, Wi-Fi is incapable of normally providing a service in association with a delay sensitive traffic.
3) CTS-to-self and RTS/CTS: this is easy to overcome a problem in having coexistence. However, the scheme has a high level contention with Wi-Fi and causes a collision, and may increase a network overhead which is a drawback. In addition, a base station needs to additionally contain a Wi-Fi transceiver module, or needs to store CTS symbol level information, and thus, may require a large system overhead. In addition, the base station needs to transmit an LAA frame immediately after CTS transmission. Accordingly, the scheme may produce actual results only when the time synchronization (time sync) between a Wi-Fi transceiver module and an LTE-LAA module is very accurate. In addition, in the case of CTS-to-self, a problem of a simultaneous transmission collision may be still raised.
4) back-off-based LBT: this has a problem of collision, similar to CTS-to-self. In addition, the scheme is incapable of setting a network allocation vector based on RTS/CTS, and a criterion that neighboring Wi-Fi use for carrier sensing of an LAA signal is determined based on an energy detection (ED) threshold and thus, the probability of exposure to Wi-Fi interference may be relatively high.

Therefore, the disclosure provides a method and apparatus for decreasing channel access contention between LAA and Wi-Fi and for minimizing interference if Wi-Fi radio access technology and LAA-LTE radio access technology coexist within a single base station device (e.g., a small cell).

FIG. 1 is a diagram illustrating the structure of a base station for a CTS/RTS-based LAA/Wi-Fi coexistence method.

Referring to FIG. 1, a base station (or a small cell) 100 includes an LAA module 102. The LAA module 102 includes an LAA transceiver 114 and a processing circuit. The processing circuit may include a processor and a memory (a channel selector 118 and a scheduler 120).

As illustrated in FIG. 1, the LAA module operates independently from a Wi-Fi module. Therefore, the LAA module may transmit a signal by only determining whether a Wi-Fi signal is present, or may perform a collision prevention transmission by utilizing RTS/CTS.

Conventionally, in the case of Wi-Fi that operates in an unlicensed band, if an access point (AP) has data to send, and sends a beacon signal, a terminal wakes up after a predetermined period of time and transmits or receives the data. In this instance, if multiple terminals access the AP, there may be multiple terminals which wake up at similar points in time, and this may cause packet collision, may cause the terminal to unnecessarily consume power, and the like. Therefore, a target wake time (TWT) technology has been employed, and thus, the AP informs a terminal of the time at which the terminal needs to wake up so as to overcome the above-mentioned problem.

Therefore, in order to alleviate a channel contention between LAA and Wi-Fi and to control interference, if a base station desires to use an unlicensed band, the disclosure provides a method in which an LAA module requests, from a Wi-Fi module, TWT service period (SP) resource allocation for LAA transmission, and the Wi-Fi module identifies the request and allocates a TWT SP so as to ease interference and contention.

To this end, according to the disclosure, the base station may include an LAA module, a Wi-Fi module, and a scheduler which is capable of controlling each of the LAA module and the Wi-Fi module. However, embodiments of the disclosure are not limited thereto, and may also be applicable to the case in which a base station includes only an LAA module. Detailed descriptions will be provided as below.

Figure 2:
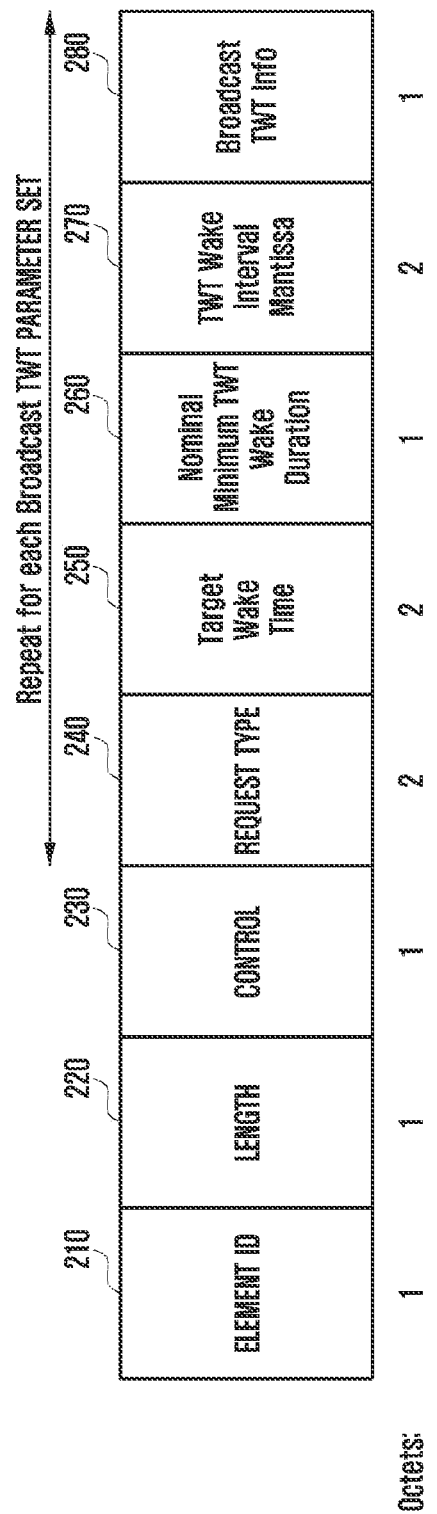
FIG. 2 is a diagram illustrating a TWT IE.

FIG. 2 is a diagram illustrating a TWT information element (IE).

Referring to FIG. 2, the TWT information element may include fields, such as element ID 210, length 220, control 230, request type 240, target wake time 250, nominal minimum TWT wake duration 260, TWT wake interval mantissa 270, broadcast TWT info 270, and the like. Based on the information, the terminal may identify a wakeup time, a wakeup period, and the like, and may transmit or receive a signal during the corresponding time.

Figure 3:
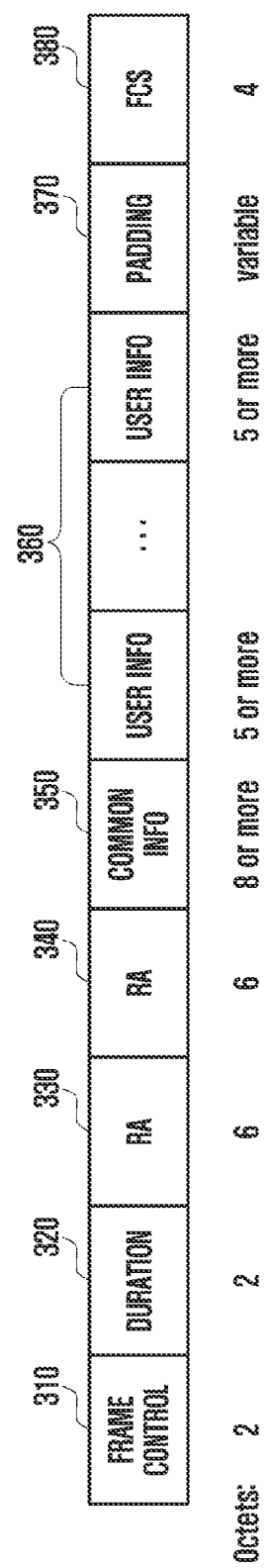
FIG. 3 is a diagram illustrating a trigger frame format.

FIG. 3 is a diagram illustrating a trigger frame format.

Referring to FIG. 3, a trigger frame may include fields, such as frame control 310, duration 320, RA 330, TA 340, common info 350, user info 360, padding 370, FCS 380, and the like.

A Wi-Fi AP module reserves use of a channel via a trigger frame, and specifies devices to use during the corresponding time. In addition, in the case of a Wi-Fi system, synchronization needs to be performed, which is a drawback. Therefore, even in the case in which a Wi-Fi AP allocates a TWT, devices that belong to a TWT service period are capable of joining transmission contention after the Wi-Fi AP transmits the trigger frame and performs synchronization.

Figure 4:
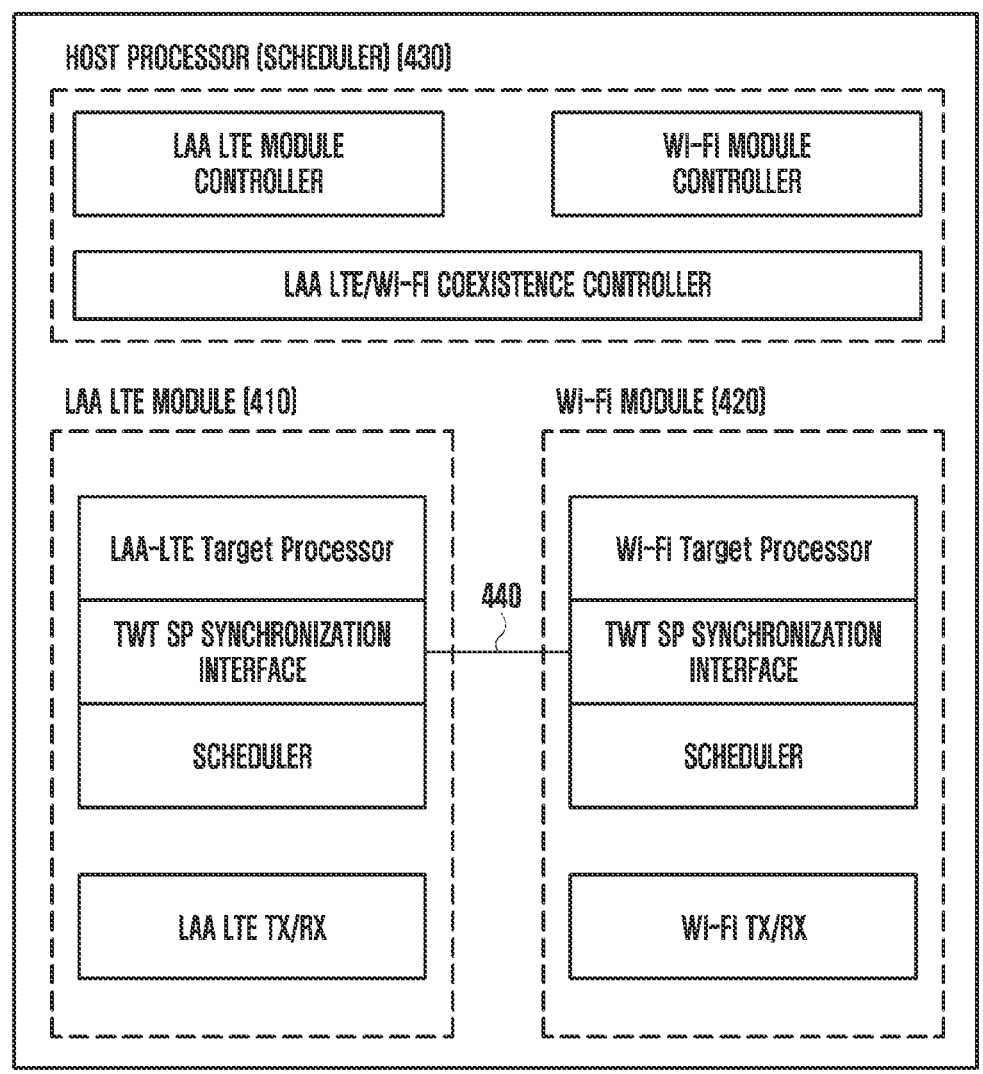
FIG. 4 is a diagram illustrating the configuration of a base station according to an embodiment of the disclosure.

FIG. 4 is a diagram illustrating the configuration of a base station according to an embodiment of the disclosure.

Referring to FIG. 4, a base station (or a small cell device) may include an LAA-LTE module 410, a Wi-Fi AP module 420, and a controller 430 that is capable of controlling each of the LAA-LTE module 410 and the Wi-Fi AP module 420. However, embodiments of the disclosure are not limited thereto, and may also be applicable to the case in which a base station includes only an LAA module.

In addition, although the disclosure provides descriptions using terms "LAA module" and "Wi-Fi module" for ease of description, "LAA module" and "Wi-Fi module" may be replaced with terms "first module" and "second module", respectively.

Further, each of the LAA module and the Wi-Fi module may include a controller (or scheduler) and a transceiver. As illustrated in FIG. 4, an interface, in addition to a target processor, may be further included. The configurations of the LAA module and the Wi-Fi module are merely examples, and some components may be omitted or added, and each component may be controlled by the controller.

The LAA-LTE module may identify channel environment information and terminal information, and a current traffic status, so as to determine whether to use a licensed/unlicensed band. Based on the determination, the LAA-LTE module may share, with an LAA-LTE terminal, information associated with a frequency and a time at which data transmission is performed, and may perform data transmission or reception.

The Wi-Fi module according to the disclosure may support an AP mode and an STA mode according to a scenario used. Detailed descriptions thereof will be provided with reference to FIG. 10 and FIG. 11.

Figure 10:
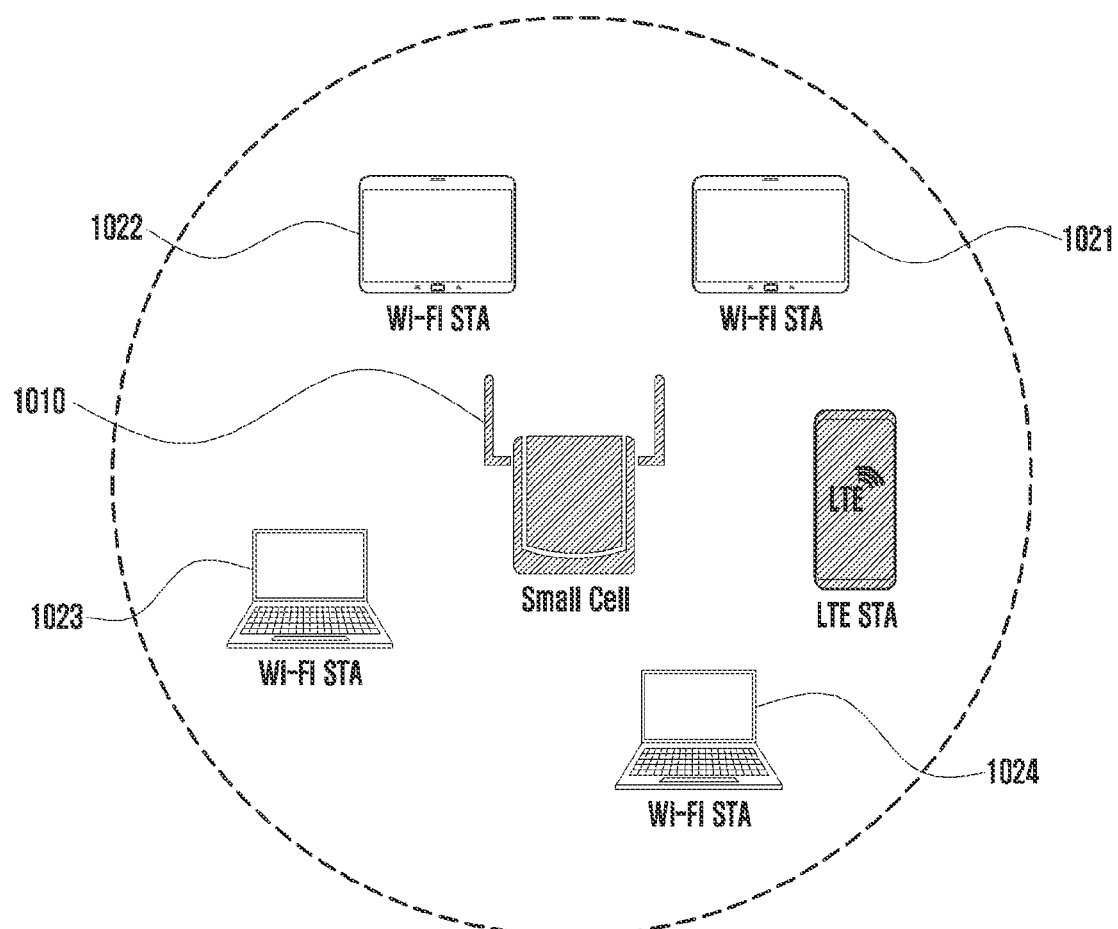
FIG. 10 is a diagram illustrating an example in which a Wi-Fi module operates in an AP mode according to an embodiment of the disclosure.

FIG. 10 is a diagram illustrating an example in which a Wi-Fi module operates in an AP mode according to an embodiment of the disclosure.

Referring to FIG. 10, in the case in which a base station (or a small cell device) 1010 provides a Wi-Fi data network service, a Wi-Fi module operates in an AP mode and provides a data network service to Wi-Fi terminals 1021, 1022, 1023, and 1024. The Wi-Fi module collects and controls information associated with Wi-Fi terminals that access the Wi-Fi module, and may use a TWT technology defined in 802.11ax or 802.11ah. The Wi-Fi module identifies a request from a terminal and a channel state, and a current traffic status, so as to control a wake time for the terminal.

Figure 11:
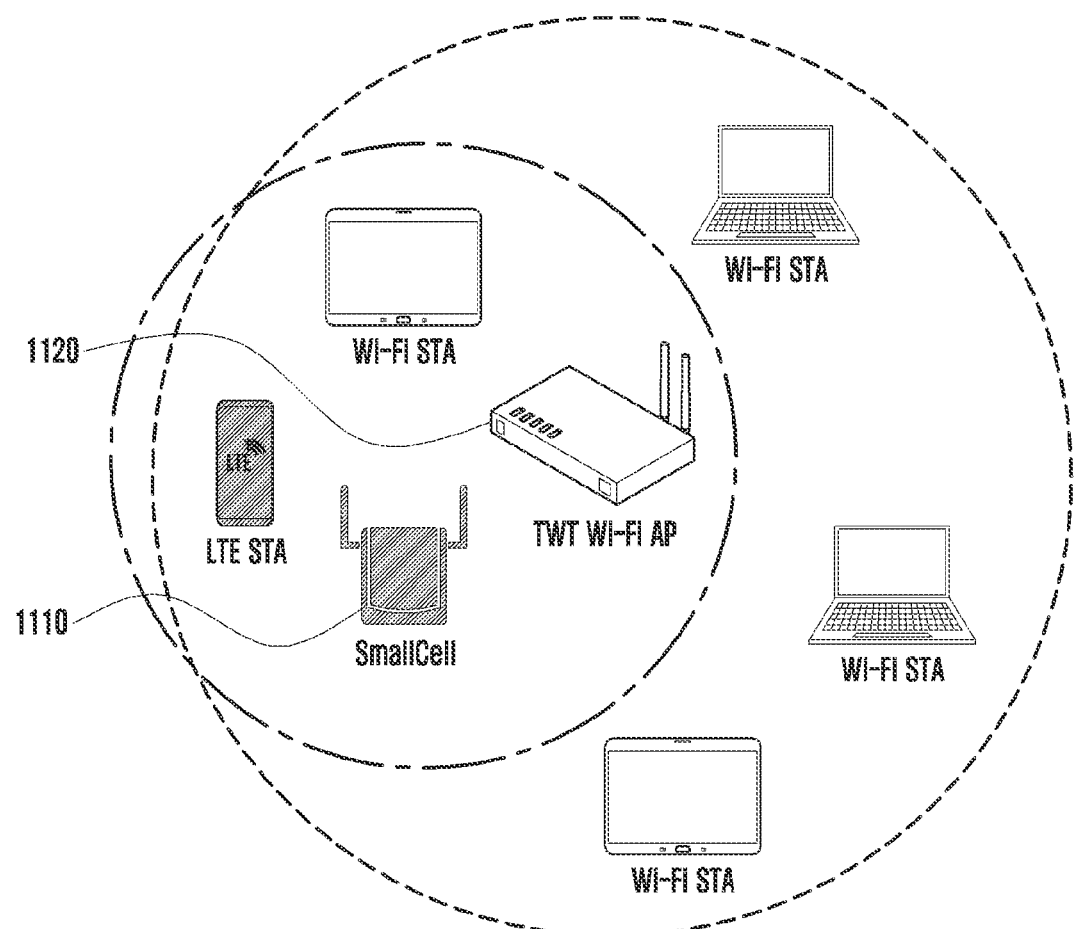
FIG. 11 is a diagram illustrating an example in which a Wi-Fi module operates in an STA mode according to an embodiment of the disclosure.

FIG. 11 is a diagram illustrating an example in which a Wi-Fi module operates in an STA mode according to an embodiment of the disclosure.

Referring to FIG. 11, in the case in which a Wi-Fi module is used for the purpose of backhaul or monitoring, as opposed to the purpose of a data network service in a base station (a small cell device) 1110, the Wi-Fi module may operate in an STA mode. Therefore, the Wi-Fi module collects ambient Wi-Fi network information and provides optimal channel information to an LAA-LTE module.

In addition, the Wi-Fi module accesses or performs association with a neighboring Wi-Fi AP 1120 that supports TWT, requests a TWT SP on behalf of the LAA-LTE module, so as to secure a service period.

As described above, if the LAA-LTE module desires to use an unlicensed band, the disclosure provides a method in which the LAA-LTE module requests, from the Wi-Fi module, TWT SP resource allocation for LAA-LTE transmission, and a Wi-Fi AP identifies the request and allocates a TWT SP so that interference and contention may be alleviated. In the disclosure, for ease of description, descriptions are provided using a term, "TWT SP resource", from the perspective that a base station configures a resource which is to be used by a terminal in an unlicensed band when the terminal wakes up. However, the scope of the disclosure is not limited thereto. That is, "TWT SP resource" may be replaced with a normal term, "unlicensed band resource", which means a resource period in an unlicensed band that the terminal is to use when waking up. That is, the operation in which the Wi-Fi module allocates a TWT SP may be replaced with an operation of setting a time at which the terminal is to use an unlicensed band.

Specifically, the LAA-LTE module requests use of a TWT SP from the Wi-Fi module. To this end, the LAA-LTE module may transmit a TWT SP request (update). The TWT SP request message may include information as below.

1) Minimum TWT SP duration: a minimum service time (us) desired to be allocated at beacon intervals
 2) TWT SP interval: a period (us) by which a TWT SP is desired to be allocated 3) Candidate channels: a channel list desired to be used, and a method of determining the channel list will be described in detail later
4) Bandwidth: a bandwidth desired to be used, for example, information associated with a bandwidth to be used for carrier aggregation (CA)
5) LAA-LTE base station information: neighboring LAA-LTE base station information and signal strength for each channel In this instance, all the information may not need to be included in the TWT SP request message, and at least one piece of the information may be included in the TWT SP request message. In addition, information other than the above-described information may be included in the message.

In response to the request, the Wi-Fi module may transfer a TWT SP response to the LAA module. The TWT SP response message may include information as below.
1) Target wake time: timing synchronization function (TSF) time, that is, information indicating a time at which a terminal needs to wake up
2) TWT SP duration: an allocated time (256 us unit), that is, information indicating a period in which a terminal transmits or receives data after waking up
3) TWT SP interval: an allocated TWT SP period (us), that is, information indicating information associated with intervals at which the resource is allocated
4) Channel: information associated with an allocated channel (IEEE channel number), and a method of selecting the channel will be described later
5) Bandwidth: an allocated bandwidth
6) Result: accept/reject, for example, to reject a resource allocation request from an LAA module, the result field may be set to "reject" and may be transmitted In this instance, all the information may not need to be included in the TWT SP response message, and at least one piece of the information may be included in the TWT SP response message. In addition, information other than the above-described information may be included in the message.

Further, if it is desired to terminate a TWT SP, a TWT SP termination message may be transmitted. The message may include a code that specifies the reason of the TWT SP termination.

In addition, information may be transmitted or received via a synchronization interface 440 (e.g., a trigger-enabled TWT SP synchronization interface). The interface may be a signaling interface which is connected between an LAA-LTE module and a Wi-Fi module in order to report the start of a TWT SP immediately after a trigger frame is transmitted. By transmitting or receiving information via the interface, the effect of the above-mentioned trigger frame transmission may be obtained. That is, an LAA is capable of starting operation accurately at the point in time at which a TWT resource is allocated. In addition, by transmitting or receiving information associated with the point in time at which the TWT resource ends via the interface, the point at which the LAA module ends operation may be accurately reported. If the LAA module and the Wi-Fi module use different clocks, a time error that could occur needs to be taken into consideration. That is, information needs to be transferred a single subframe transmission time ahead of the start and end of the TWT SP, the single subframe transmission time being a minimum operation time of an LAA device. Information transmitted via the LAA module and the interface may be as below.

1) During trigger-enabled TWT SP: SIG_UP (1)
2) During out-of-trigger-enabled TWT SP: a signal of SIG_DOWN (0) may be transmitted or received via the interface Hereinafter, detailed operations of the disclosure will be described.

Figure 5:
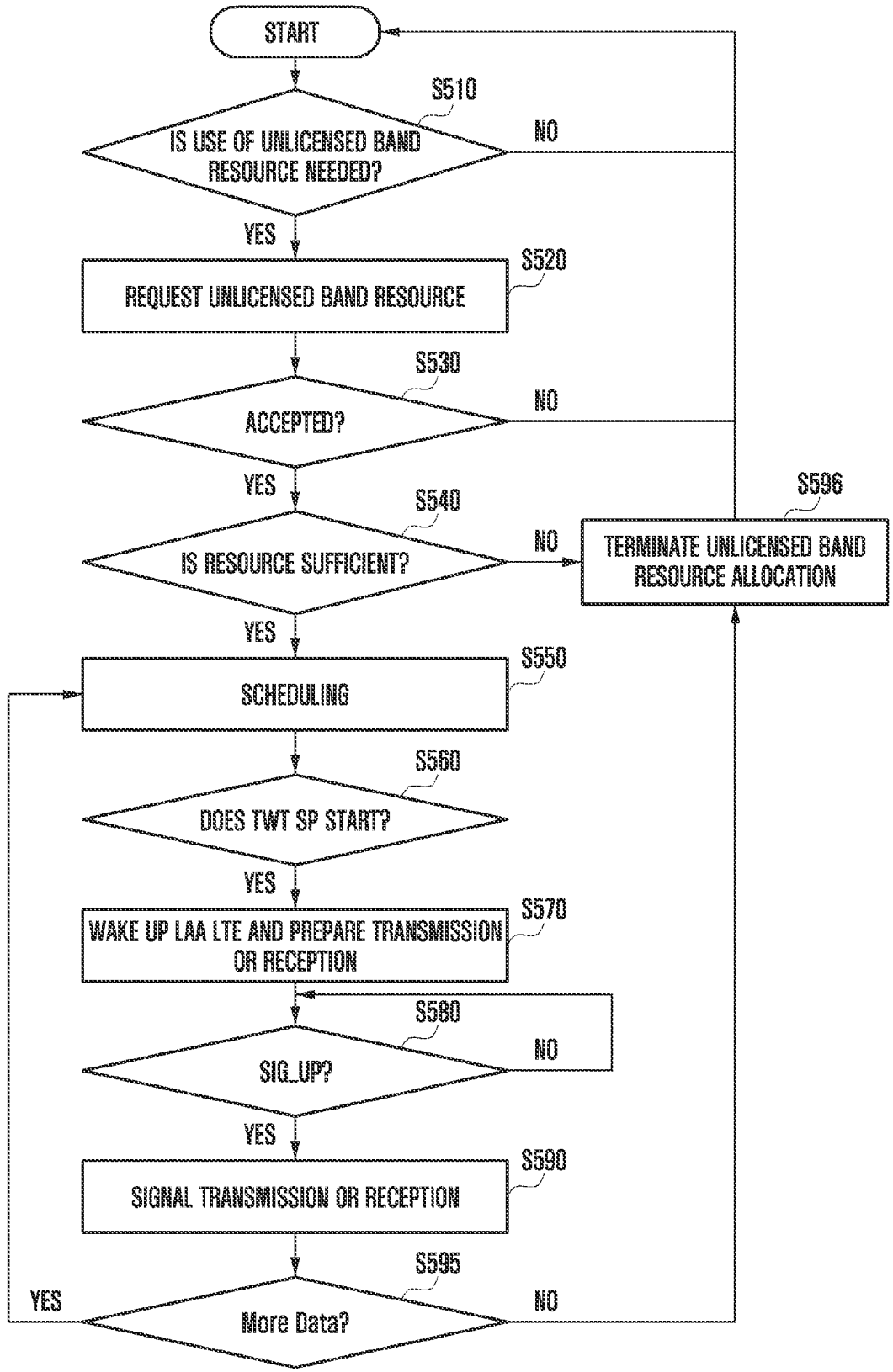
FIG. 5 is a diagram illustrating a process in which an LAA module receives allocation of a resource of an unlicensed band according to an embodiment of the disclosure.

FIG. 5 is a diagram illustrating a process in which an LAA module receives allocation of a resource of an unlicensed band according to an embodiment of the disclosure.

Referring to FIG. 5, a base station identifies whether use of a resource of an unlicensed band is requested (or is needed) in operation S510. For example, if a resource of a licensed band to be used is insufficient, the base station may determine that a resource of an unlicensed band needs to be used.

If the use of the unlicensed band is needed, an LAA module of the base station transmits a TWT SP request message that requests a resource of the unlicensed band to a Wi-Fi module in operation S520.

The Wi-Fi module of the base station may determine whether to allocate a resource of the unlicensed band (TWT SP for LAA-LTE) for LAA, based on the request information. If unlicensed band resource allocation fails or it is determined not to allocate a resource of the unlicensed band, the Wi-Fi module transmits a TWT SP response message so as to reject the request.

If a resource of the unlicensed band is allocable, the Wi-Fi module of the base station may allocate one of TWT IDs which are currently not allocated, and may determine an unlicensed band resource (LAA-LTE TWT SP). In addition, the Wi-Fi module transmits a TWT SP response message based on the determined information, and accepts the received request.

The LAA-LTE module identifies whether the request is accepted based on the received response message in operation S530. In addition, the LAA module identifies the allocated unlicensed band resource in operation S540, and determines whether to join TWT.

If the allocated unlicensed band resource (SP) in the response is insufficient, the LAA module may terminate unlicensed band resource allocation (TWT SP) in operation S596. If the unlicensed band resource allocation is terminated, the LAA-LTE module operates in a contention mode, as opposed to a TWT operation mode.

If the allocated unlicensed band resource (SP) is sufficient, the LAA module may schedule (scheduling) the resource for the LAA-LTE terminal based on the allocated unlicensed band resource (TWT SP) in operation S550, and may wait until a TWT SP start point arrives. In addition, the Wi-Fi module may inform another Wi-Fi terminal of a service period for LAA-LTE via a beacon signal.

If a TWT SP starts in operation S560, the LAA-LTE module wakes up and prepares a transmission or reception operation in operation S570, and identifies whether a synchronization interface (TWT SP synchronization interface) is in an SIG_UP state in operation S580.

If the synchronization interface is in the SIG_UP state, the LAA module starts signal transmission or reception in operation S590. After signal transmission or reception ends, the LAA module identifies whether signal transmission is continuously needed in operation S595. If signal transmission is continuously needed, the LAA module waits for a subsequent TWT SP, and schedules a resource for the LAA terminal in operation S550. If unlicensed band transmission is not needed, the LAA module terminates unlicensed band resource allocation (TWT SP) in operation S596.

The drawing may include only some components by omitting some components within the scope that does not change the subject matter of the disclosure.

Figure 6:
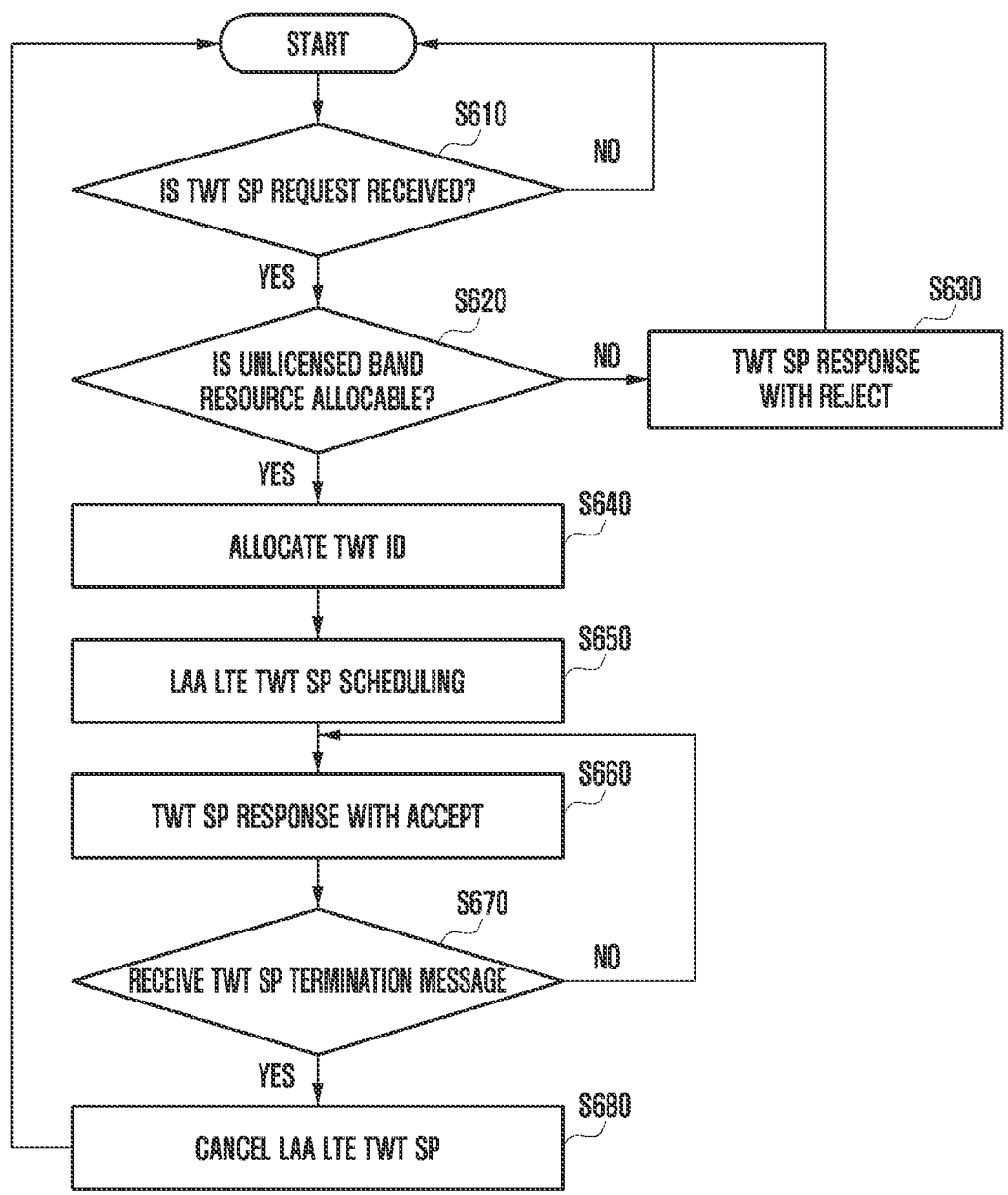
FIG. 6 is a diagram illustrating a process of allocating a resource of an unlicensed band if a Wi-Fi module is in an AP mode according to an embodiment of the disclosure.

FIG. 6 is a diagram illustrating a process of allocating a resource of an unlicensed band if a Wi-Fi module is in an AP mode according to an embodiment of the disclosure.

Referring to FIG. 6, a Wi-Fi module receives a TWT SP request message from an LAA module in operation S610.

The Wi-Fi module of a base station determines whether an unlicensed band resource (TWT SP for LAA) is allocable based on the request information in operation S620.

If the TWT SP is not allocable, the Wi-Fi module transmits a TWT SP response message so as to reject the request in operation S630.

If the unlicensed band resource is allocable, the Wi-Fi module of the base station may allocate one of TWT IDs which are currently not allocated in operation S640, and may schedule the unlicensed band resource (LAA TWT SP) in operation S650. In addition, the Wi-Fi module transmits a TWT SP response message based on the determined information so as to accept the received request in operation S660.

The Wi-Fi module determines whether a TWT SP termination message is received in operation S670. If the SP that is allocated to the LAA module is insufficient or unlicensed band transmission is not needed, the Wi-Fi module may receive the TWT SP termination message. If the TWT SP termination message is received, the Wi-Fi module cancels unlicensed band resource allocation (LAA TWT SP) in operation S680.

The drawing may include only some components by omitting some components within the scope that does not change the subject matter of the disclosure.

Figure 7:
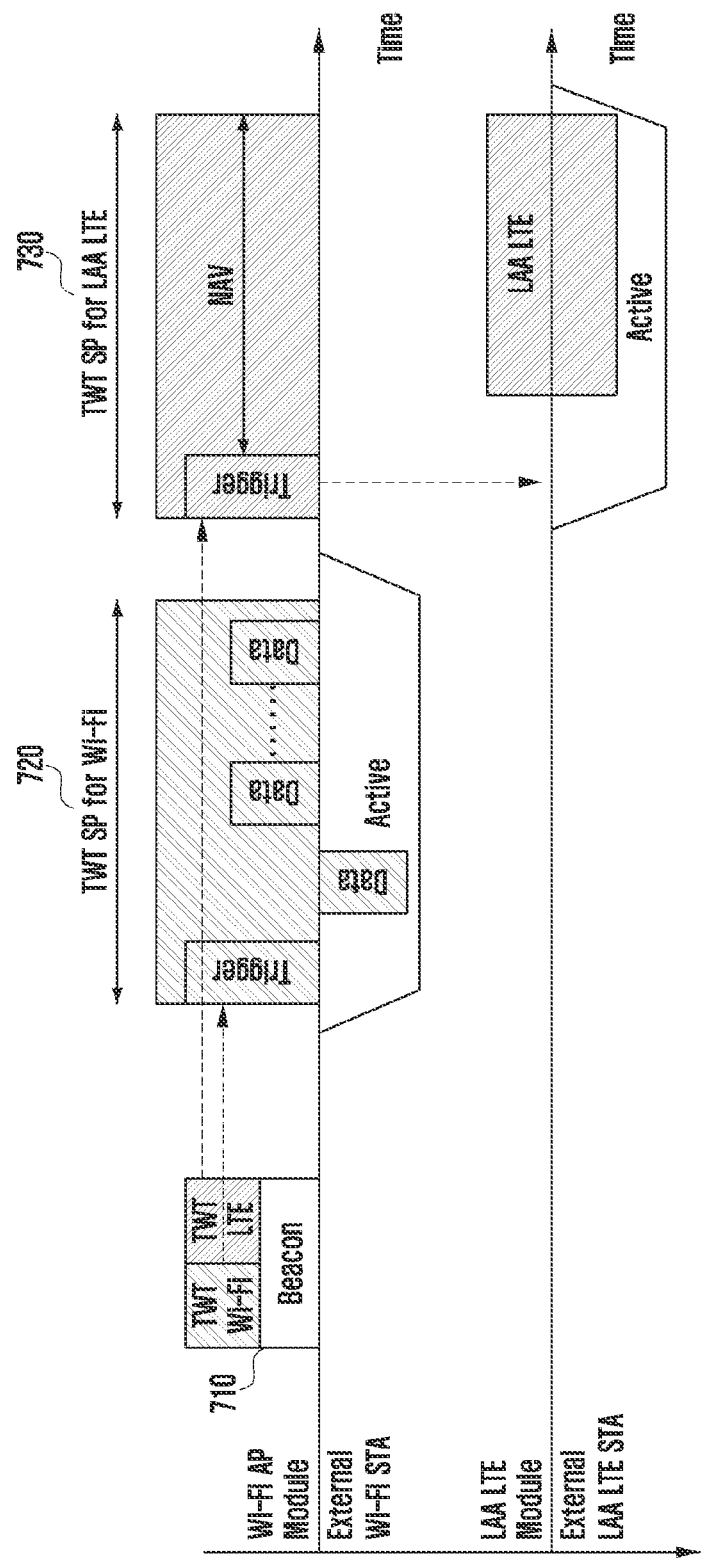
FIG. 7 is a diagram illustrating an example in which a Wi-Fi TWT SP and an LAA-LTE TWT SP coexist if a Wi-Fi module operates in an AP mode according to an embodiment of the disclosure.

FIG. 7 is a diagram illustrating an example in which a Wi-Fi TWT SP and an LAA-LTE TWT SP coexist if a Wi-Fi module operates in an AP mode according to an embodiment of the disclosure.

A Wi-Fi AP transmits a beacon frame periodically, and transmits TWT IEs. In this instance, a TWT IE operates according to IEEE 802.11 standard. During an unlicensed band resource period (Wi-Fi TWT SP) 720 allocated for Wi-Fi, Wi-Fi devices belonging to a TW ID may operate according to the TW ID specified in a TWT IE. During an unlicensed band resource period (LAA TWT SP) 730 allocated for LAA-LTE, only LAA-LTE devices may operate. All devices belonging to TWT may need to operate only in their service periods (SP). In order to prevent interference from a device that does not belong to TWT or legacy Wi-Fi devices during the LAA-LTE TWT SP, a base station sets a NAV as long as the length of the SP, and transmits a trigger frame.

Immediately after the trigger frame is transmitted, a TWT SP synchronization interface enters the SIG_UP states, and LAA-LTE transmission or reception starts. The detailed method of LAA-LTE transmission is omitted.

If the trigger frame does not cover enough the LAA-LTE TWT SP, the base station divides the triggering frame and transmits the same several times. During the trigger frame transmission time, the TWT SP synchronization interface needs to maintain an SIG_DOWN state. After the LAA-LTE TWT SP ends, LAA-LTE terminals return to an idle state.

Hereinafter, a TWT SP allocation method for LAA will be described.

A Wi-Fi module continuously measures channel utilization (CU, %) which is currently used. The Wi-Fi module estimates a currently available channel duration (Tcu) based on a beacon interval and the CU. The Wi-Fi module estimates the maximum allocable channel duration (Tres), excluding the currently allocated TWT SP.

In addition, the Wi-Fi module determines whether to accept the allocation request from the LAA module, based on a requested channel duration and the maximum allocable channel duration. For example, if $$\frac{T_{res}}{\text{Beacon Interval (sec)}}$$

(a remaining service period per second) is greater than $$\frac{T_{req}}{\text{TWT SP Interval (sec)}}$$

(a requested service period per second), the Wi-Fi module accepts the requested TWT SP allocation, and allocates a resource in response to the request. If the remaining capacity is insufficient, the Wi-Fi module allocates a TWT SPS as much as the remaining time. If a time to be allocated does not remain, the Wi-Fi may reject the TWT SP allocation request. If the noise floor of the channel that is being measured is significantly high, the Wi-Fi module also rejects the TWT SP allocation request. If the request is rejected, or the allocated remaining time is insufficient, the LAA-LTE module terminates the TWT SP, and operates in a contention mode, as opposed to operating in a TWT operation mode.

Hereinafter, operation when the Wi-Fi module operates in an STA mode will be described.

Figure 8:
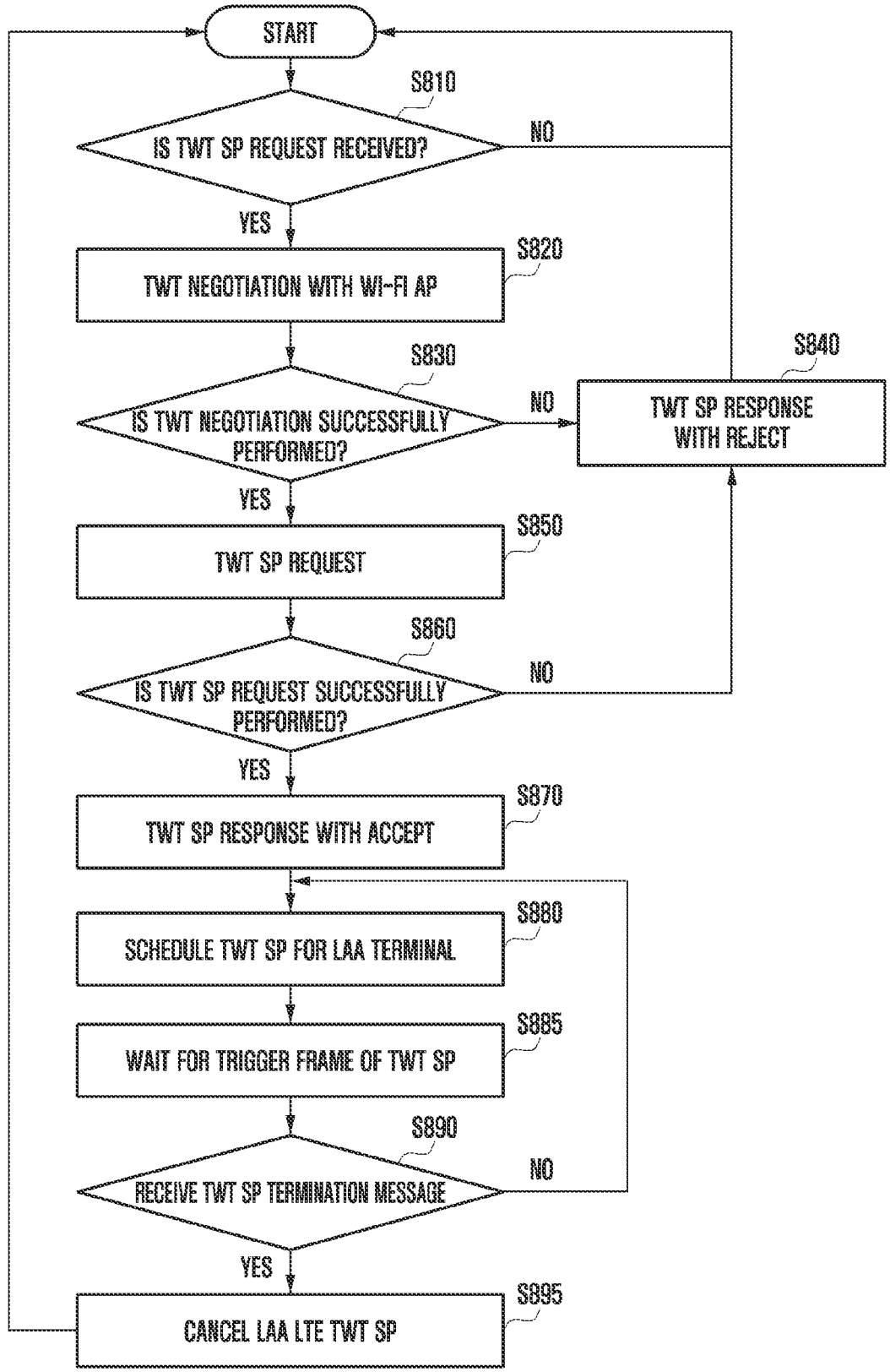
FIG. 8 is a diagram illustrating a process of allocating a resource of an unlicensed band if a Wi-Fi module is in an STA mode according to an embodiment of the disclosure.

Even in the case in which the Wi-Fi module operates in the STA mode, the LAA module of FIG. 5 may perform the same operation FIG. 8 is a diagram illustrating a process of allocating a resource of an unlicensed band if a Wi-Fi module is in an STA mode according to an embodiment of the disclosure.

If an LAA-LTE module needs to use an unlicensed band, the LAA-LTE module requests a TWT SP from the Wi-Fi module. Therefore, the Wi-Fi module may receive a TWT SP request message from the LAA module in operation S810.

The Wi-Fi module performs TWT negotiation with an AP to which the Wi-Fi module is connected, in response to the request in operation S820. If the TWT negotiation is already done, this operation may be omitted. The TWT negotiation may be performed according to a TWT operation defined in 802.11ax standard.

The Wi-Fi module determines whether the TWT negotiation is successfully performed in operation S830. TWT negotiation is the process in which a Wi-Fi terminal and an AP identify whether TWT is supported therebetween and identify whether joining TWT is agreed. If the connected Wi-Fi AP does not support a TWT function, the Wi-Fi AP transmits a TWT SP response message so as to reject the request.

If the TWT negotiation is successfully performed, the Wi-Fi module transmits a TWT SP request to the AP in operation S850. The Wi-Fi module transmits a TWT request frame to the connected AP in order to perform request, and waits for a TWT SP.

The Wi-Fi module may determine whether requesting the TWT SP is successfully performed in operation S860. If the Wi-Fi module receives a TWT SP response message (reject message) that rejects a TWT SP from the Wi-Fi AP in response to the TWT SP request, the Wi-Fi module transmits a TWT SP response message to the LAA-LTE module so as to reject the TWT SP request. If an allocated SP in the response received from the Wi-Fi AP is insufficient, the Wi-Fi module may terminate the TWT SP.

Therefore, the LAA module operates in a contention mode, as opposed to operating in a TWT operation mode.

If requesting the TWT SP is successfully performed, the Wi-Fi module may receive a response message that accepts the TWT SP request in operation S870.

Therefore, the Wi-Fi module may identify a TWT IE that the connected Wi-Fi AP transmits, may schedule an LAA-LTE terminal, and may wait until a TWT SP start point arrives in operation S880 and S885.

If the Wi-Fi module receives a trigger frame from the AP, the Wi-Fi module determines that the TWT SP starts, and switches a TWT SP synchronization interface to an SIG_UP state.

The LAA-LTE module starts transmission or reception after checking whether the TWT SP synchronization interface is in the SIG_UP state while preparing data transmission. After transmission or reception ends, the LAA module waits for a subsequent TWT SP if transmission is continuously needed. The LAA module terminates the TWT SP if unlicensed band transmission is not needed.

Therefore, the Wi-Fi module receives a TWT SP termination message in operation S890. The Wi-Fi module cancels the TWT SP for the LAA module in operation S895.

Figure 9:
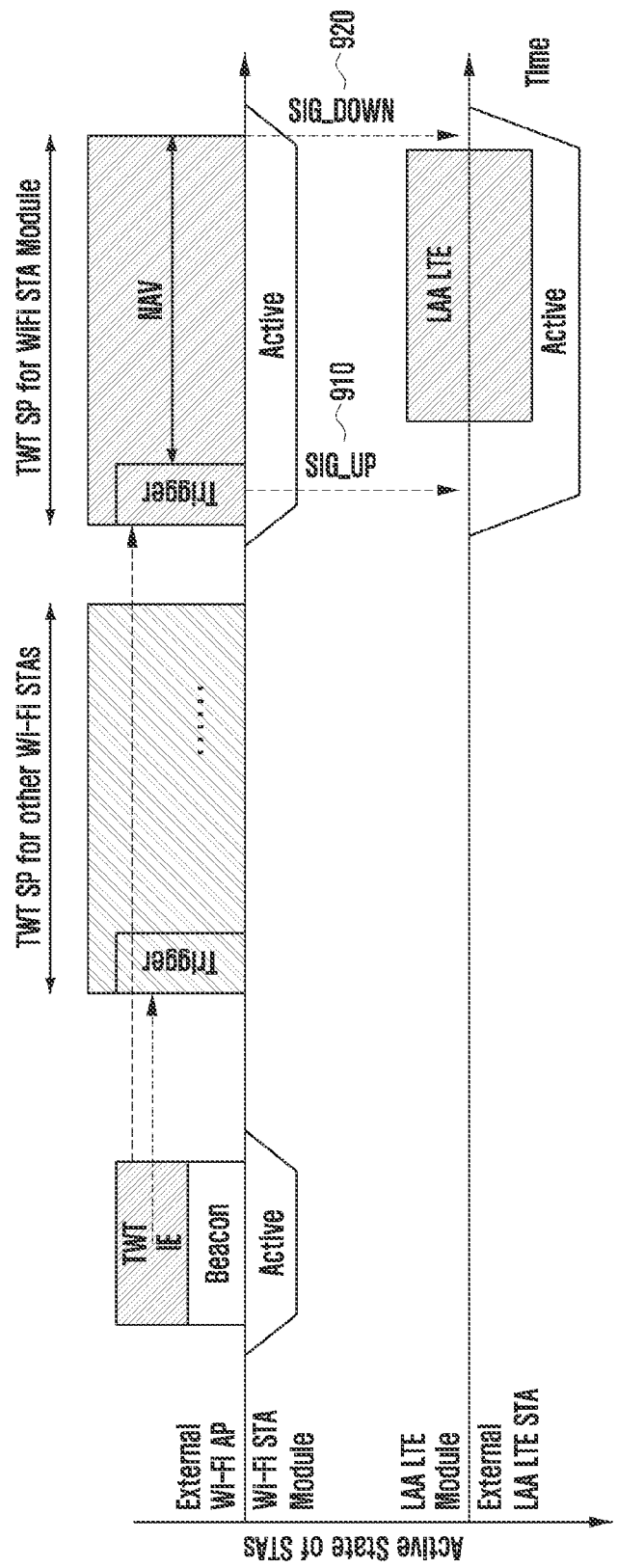
FIG. 9 is a diagram illustrating an example in which a TWT SP and an LAA-LTE TWT SP coexist if a Wi-Fi module operates in an STA mode according to an embodiment of the disclosure.

FIG. 9 is a diagram illustrating an example in which a TWT SP and an LAA-LTE TWT SP coexist if a Wi-Fi module operates in an STA mode according to an embodiment of the disclosure.

A Wi-Fi module operating in an STA mode receives a TWT IE of a beacon frame that is periodically transmitted from a connected Wi-Fi AP. The Wi-Fi module identifies the TWT IE, and if a TWT SP allocated to the Wi-Fi module is present, the Wi-Fi module wakes up in order to receive a trigger frame at the corresponding time. If the trigger frame is received, a TWT SP synchronization interface is switched to an SIG_UP state 910 and LAA-LTE transmission or reception starts.

If the trigger frame does not cover enough an LAA-LTE TWT SP, the trigger frame is divided and transmitted several times. During the trigger frame transmission time, the TWT SP synchronization interface needs to maintain a SIG_DOWN state 920. After the LAA-LTE TWT SP ends, LAA-LTE terminals return to an idle state.

Hereinafter, a channel selection method for LAA will be described. In order to select an optimal channel for LAA-LTE transmission, the Wi-Fi module may select a channel using neighboring LAA-LTE base station information and ambient Wi-Fi information.

The Wi-Fi module may select an optimal channel using the strength of a received signal. In this instance, the signal strength may include at least one of a reference signal received power (RSRP) or a received signal strength indication (RSSI). In addition, noise may be taken into consideration in order to select an optimal channel. Specifically, for example, the Wi-Fi module may estimate load metric shown below in order to select an optimal channel.

$$RSRP_{LTE} = \sum_{j \in eNB} RSRP(eNB_j)$$

$$RSSI_{WiFi} = \sum_{j \in AP} RSSI(AP_j)$$

$$Load = W_{LTE} \times RSRP_{LTE} + W_{WiFi} \times RSSI_{WiFi} + W_{NF} \times NF$$

A reference signal received power (RSRP) (dBm) is the signal strength of a neighboring base station measured by an LAA-LTE device. A received signal strength indication (RSSI) (dBm) is the signal strength of a neighboring Wi-Fi AP measured by a Wi-Fi device. A noise floor (NF) is an ambient ambiguous noise measured by the Wi-Fi device. Based on the result of the calculation, the Wi-Fi device may select a channel that has the lowest load, and may transfer information associated with the selected channel to the LAA-LTE device via a TWT SP response message.

When allocating an unlicensed band resource (TWT negotiation), a Wi-Fi TWT SP duration and a TWT SP interval may be changed depending on the amount of resources that LAA needs. In order to determine the same, the LAA-LTE module estimates throughput ($R_{uband}$, bps) required in an unlicensed band. $R_{uband}$ may be estimated based on the difference between a packet rate (bps) received in the current queue and throughput ($R_{band}$, bps) provided in the current licensed band. The Wi-Fi TWT SP duration and the TWT SP interval needed may be determined based on the estimated $R_{uband}$ and the data rate of LTE.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Further, in methods of the disclosure, some or all of the contents of each embodiment may be combined without departing from the essential spirit and scope of the disclosure.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical spirit of the disclosure. Further, the above respective embodiments may be employed in combination, as necessary.

The invention claimed is:

1. A method of a first module of a base station in a wireless communication system, the method comprising:
   transmitting a resource allocation request message associated with an unlicensed band to a second module if use of the unlicensed band is needed;
   receiving, from the second module, a response message including information associated with a time when to use the unlicensed band; and
   allocating, based on the response message, a resource of the unlicensed band to a terminal,
   wherein the request message comprises at least one of a minimum use time of a resource of the unlicensed band, a period, a channel list, a bandwidth desired to be used, and neighboring base station information for each channel,
   wherein the response message comprises at least one of a period of an allocated resource in association with the unlicensed band, an allocated channel, and an allocated bandwidth, and
   wherein the allocated resource of the unlicensed band is a dedicated service period for a terminal connected to the first module.

2. The method as claimed in claim 1, further comprising:
transmitting information related to synchronization via an interface connected between the first module and the second module,
wherein, during a period of the resource of the unlicensed band, a terminal connected to the first module is activated, and an identifier for identifying the resource of the unlicensed band is allocated, and
wherein the resource of the unlicensed band is determined based on a channel that is determined based on at least one of a signal strength or a noise in the unlicensed band.

3. The method as claimed in claim 1, wherein the allocating further comprises:
terminating a resource allocation procedure associated with the unlicensed band if the resource of the unlicensed band is insufficient.

4. A method of a second module of a base station in a wireless communication system, the method comprising:
receiving a resource allocation request message associated with an unlicensed band from a first module if use of the unlicensed band is needed;
determining whether a resource of the unlicensed band is allocable; and
if the resource of the unlicensed band is allocable, transmitting a response message including information associated with a time when to use the unlicensed band,
wherein the request message comprises at least one of a minimum use time of a resource of the unlicensed band, a period, a channel list, a bandwidth desired to be used, and neighboring base station information for each channel,
wherein the response message comprises at least one of a period of an allocated resource in association with the unlicensed band, an allocated channel, and an allocated bandwidth, and
wherein the allocated resource of the unlicensed band is a dedicated service period for a terminal connected to the first module.

5. The method as claimed in claim 4, further comprising:
receiving information related to synchronization via an interface connected between the first module and the second module,
wherein, during a period of the resource of the unlicensed band, a terminal connected to the first module is activated, and an identifier for identifying the resource of the unlicensed band is allocated, and
wherein the resource of the unlicensed band is determined based on a channel that is determined based on at least one of a signal strength or a noise in the unlicensed band.

6. The method as claimed in claim 4, wherein a resource allocation procedure associated with the unlicensed band is terminated if the resource of the unlicensed band is insufficient.

7. A first module of a base station in a wireless communication system, the first module comprising:
a transceiver; and
a controller configured to:
transmit a resource allocation request message associated with an unlicensed band to a second module if use of the unlicensed band is needed;
receive, from the second module, a response message including information associated with a time when to use the unlicensed band; and
allocate, based on the response message, a resource of the unlicensed band to a terminal,
wherein the request message comprises at least one of a minimum use time of a resource of the unlicensed band, a period, a channel list, a bandwidth desired to be used, neighboring base station information for each channel,
wherein the response message comprises at least one of a period of an allocated resource in association with the unlicensed band, an allocated channel, and an allocated bandwidth, and
wherein the allocated resource of the unlicensed band is a dedicated service period for a terminal connected to the first module.

8. The first module as claimed in claim 7, wherein the controller is configured to transmit information related to synchronization via an interface connected between the first module and the second module,
wherein, during a period of the resource of the unlicensed band, a terminal connected to the first module is activated, and an identifier for identifying the resource of the unlicensed band is allocated, and
wherein the resource of the unlicensed band is determined based on a channel that is determined based on at least one of a signal strength or a noise in the unlicensed band.

9. The first module as claimed in claim 7, wherein the controller is further configured to terminate a resource allocation procedure associated with the unlicensed band if the resource of the unlicensed band is insufficient.

10. A second module of a base station in a wireless communication system, the second module comprising:
a transceiver; and
a controller configured to:
receive a resource allocation request message associated with an unlicensed band from a first module if use of the unlicensed band is needed;
determine whether a resource of the unlicensed band is allocable; and
transmit a response message including information associated with a time when to use the unlicensed band if the resource of the unlicensed band is allocable,
wherein the request message comprises at least one of a minimum use time of a resource of the unlicensed band, a period, a channel list, a bandwidth desired to be used, and neighboring base station information for each channel,
wherein the response message comprises at least one of a time at which a resource of the unlicensed band is allocated, a period of the allocated resource, an allocated channel, and an allocated bandwidth, and
wherein the allocated resource of the unlicensed band is a dedicated service period for a terminal connected to the first module.

11. The second module as claimed in claim 10,
wherein the second module is further configured to receive information related to synchronization via an interface connected between the first module and the second module, and
wherein, during a period of the resource of the unlicensed band, the terminal connected to the first module is activated.

12. The second module as claimed in claim 10, wherein, if the resource of the unlicensed band is insufficient, a resource allocation procedure associated with the unlicensed band is terminated; and an identifier for identifying the resource of the unlicensed band is allocated, and wherein the resource of the unlicensed band is determined based on a channel that is determined based on at least one of a signal strength or a noise in the unlicensed band.

* * * * *